Jan. 7, 1964     R. WAROUX     3,116,659
EXPOSURE CONTROL FOR STILL OR MOVING PICTURE CAMERAS
Filed Sept. 28, 1959     4 Sheets-Sheet 3

INVENTOR:
Raoul Waroux
BY
ATTORNEY

Jan. 7, 1964 R. WAROUX 3,116,659
EXPOSURE CONTROL FOR STILL OR MOVING PICTURE CAMERAS
Filed Sept. 28, 1959 4 Sheets-Sheet 4

INVENTOR:
Raoul Waroux,

BY Homer C. Montague
ATTORNEY

United States Patent Office 3,116,659
Patented Jan. 7, 1964

3,116,659
EXPOSURE CONTROL FOR STILL OR MOVING PICTURE CAMERAS
Raoul Waroux, Paris, France, assignor, by mesne assignments, to Inventions Finance Corporation, a corporation of Delaware
Filed Sept. 28, 1959, Ser. No. 842,822
5 Claims. (Cl. 88—16)

This invention pertains to exposure controls for photographic cameras, and especially to such equipment in which the degree of film exposure is automatically controlled by a photometric measurement of the existing light intensity.

Numerous proposals have been made, in the prior art, for an automatic control or regulation of the exposure factors (shutter speed, diaphragm opening) in camera work. Since the available electrical energy from practical photocells is very minute, and the measuring instrument or galvanometer correspondingly delicate, these proposals have involved a considerable mechanical complication and expense in order to utilize mechanical energy supplied by the operator to accomplish the actual work of setting the diaphragm or other exposure-modulating device. The resulting apparatus has, as a result, usually been adapted only for one particular type or kind of camera, into which the exposure control features must be incorporated at the factory.

It is accordingly a principal object of the present invention to provide such an automatic exposure regulator of great simplicity and low cost, and which shall be adaptable not only to a wide variety of existing cameras, both still and movie types, but which shall be so constructed that it can be added as an accessory by the owner of such cameras, or readily changed from one camera to another to reduce the expense of providing automatic exposure regulation for his various pieces of photographic equipment.

It is a further main object of the invention to provide apparatus as described in which an electro-mechanical system, utilizing to the full the energy output of the photoelectric cell for light-measuring purposes, completely relieves this source of all of the work incidental to the proper setting of the exposure regulator, for example the diaphragm, the latter operation being accomplished by an auxiliary circuit including a miniature battery which operates an electro magnet or the like to perform an automatic disconnection of the diaphragm lever or the like when it has been brought to a properly adjusted position. The system provides a maximum of simplicity, reliability and flexibility of application to different types of cameras as compared with prior art apparatus directed to the same general purpose.

Still another object of the invention is to provide equipment of the kind already described which, when applied to a conventional movie camera, will automatically produce a desirable "fade-in" or gradual increase in the film illumination up to the value requisite for properely exposed film at the scene brightness then existing, this fade-in operation being achieved at the commencement of each distinct scene. Also, the same construction will automatically produce a desirable "fade-out" of the scene exposure at the end of each complete scene or series of frames, from the already-established optimum exposure level (under photocell control) down to substantially zero exposure. The result will be the automatic production of a so-called "dissolve" between successive scenes of the finished film, without any manual manipulation of the diaphragm by the user, and without requiring any special film editing or like operations.

Another object of the invention is to provide a camera equipment of the above type in which the control effect of the photoelectric cell can be modulated by two different exposure parameters, for example the film sensitivity and the shutter speed setting (or frames-per-second setting in the case of movie cameras), using a single variable rheostat in the photocell circuit in place of the multiple modulating devices required by prior arrangements of this general kind.

Further objects of the invention are to provide apparatus of this kind which shall have very long battery life to minimize disappointments as well as to render the operation very economical; to provide for an optional manual control of the diaphragm opening whenever the user prefers to override the automatic setting, and to provide for optional omission of the "dissolve" feature when desired.

The above and other objects and advantages of the invention will best be understood by referring now to the following detailed specification of certain preferred embodiments of the novel construction principles, given by way of example and not for purposes of limitation; the description referring specifically to the appended drawings, in which.

*First Embodiment*

Figure 1:
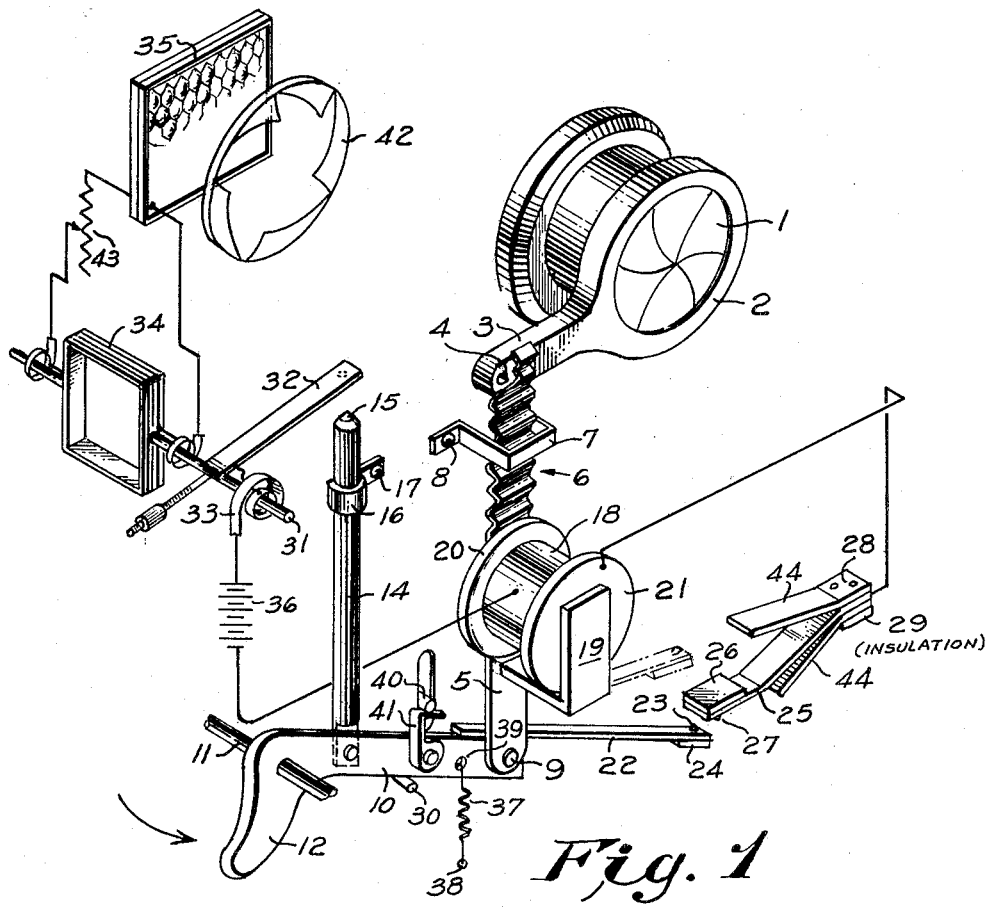
FIG. 1 is a perspective partly exploded view of the invention as incorporated into a camera of the still or motion picture type, parts not essential to the understanding being omitted for clarity.

Referring first to FIGURE 1 of the drawings, numeral 1 designates a camera diaphragm of the usual type, whose opening is arranged to be adjusted upon rotation of the diaphragm ring 2, for example by movement of the adjusting arm 3 secured to the ring. Near the free end of arm 3 the latter is provided with an upstanding or pointed detent 4 disposed to be engaged by a flexible steel spring blade 5 whose upper portion is corrugated as at 6 to permit a driving connection to detent 4. A guide 7, secured to a mounting plate of the camera body (or of the casing for the control apparatus) as by screw 8, constrains blade 5 for vertical rectilinear motion.

The lower end of blade 5 is pivoted at 9 to one end of a crank 10, in turn pivoted on the mounting as at 11, the opposite end 12 of the crank forming the operating lever for the control apparatus. Between pivots 9 and 11, crank 10 also has a pivotally connected detector arm 14 which terminates at its upper end in an electrical contact 15, for example of contact silver or the like. Detector arm 14 is constrained for vertical reciprocation as by a guide 16 mounted as by screw 17 on the mounting plate.

An electromagnet 18, having core structure 19, is wound upon a bobbin whose end plates are shown at 20 and 21, and is secured (by means not shown) to the mounting plate in position to attract spring blade 5 and bend it sufficiently to disengage the corrugated end 6 out of engagement with detent 4. The energizing circuit for the magnet 18 includes a contact pair arranged to be operated by crank 10, the crank and detector arm 14 also forming part of the circuit and thus being made of conductive material.

The contact pair includes a springy contact arm 22 secured to or integral with crank 10, and carrying the contact element 23 (silver, for example) on the upper side of its free end. The under side of this end of the arm carries an insulating layer or piece 24, for a reason to be described. The other contact part is furnished by a springy metal arm 25 one end of which is fastened to the main mounting plate as at 28, but insulated from the plate as by an insulating bracket 29. The free end of arm 25 carries on its upper surface the insulation 26, and on its under surface the contact element 27. The arms 22 and 25 are so positioned that as crank 10 rotates counter-clockwise, elements 23 and 27 engage one another to complete a circuit to the magnet 18, but on further motion in the same direction the arm 22 slips past arm 25 and breaks this circuit. The insulation 24, 26 prevents the circuit from closing again during the clockwise return motion of crank 10. Arms 44 may be provided to limit the bending motion of spring arm 25 and facilitate the slip-off action. A stop pin 30 limits the clockwise position of crank 10, towards which it is urged by a spring 37 connected to the crank as at 39 and to the mounting plate as at 38.

The photoelectric control for establishing the diaphragm setting in accordance with the scene brightness will now be described. It includes the conventional photocell 35 of the self-generating type, mounted to respond to light emanating from the scene, and connected to the moving coil 34 of a meter movement of the D'Arsonval type. The moving needle 32 of the movement is formed of metal and may have a noble metal contact element at its free end, the parts being disposed so that the needle end may in its path of motion be contacted by the contact 15 of detector arm 14. The needle 32 has the usual current-conducting spring 33 at its pivot axis 31, in turn connected to a small battery 36. A usual form of counterbalance for the moving system of the galvanometer is provided, as illustrated in FIGURE 1.

The trip button for the camera is indicated at 40, disposed for engagement during an initial part of the counter-clockwise motion of crank 10 (in the case of an installation in a motion picture camera), or during a final part of the crank motion (in the case of a still camera). Thus, upward motion of button 40 will start the exposure series in a movie camera, or will trip the shutter of a still camera. So that the same control equipment may be used with either kind of camera, the crank 10 may carry a swingable abutment 41 which in the position shown in FIGURE 1 will operate button 40 of a movie camera very shortly after commencement of the counter-clockwise movement of crank 10. With the abutment 41 swung down, as in FIGURE 2, the shutter of a still camera will not be tripped until the motion of crank 10 is nearly completed.

*Operation—Motion Picture Camera*

With the camera aimed at the scene to be photographed, cell 35 will be energized by the scene brightness and needle 32 will thus assume a position depending on that light value; the higher the light value, the nearer needle 32 will lie to the upper end contact 15 of detector arm 14. To commence the operation, the user pushes in on end 12 of crank 10 (arrow in FIGURE 1), and since abutment 41 is in its upturned position, the camera release button 40 will be operated at once, and film feeding and shutter operation will commence. However, diaphragm 1 is at this time nearly closed, so the first few film frames will be grossly underexposed.

At or about the same time, the rotation of crank 10 causes contacts 23 and 27 to engage, preparing a circuit from battery 36 to magnet 18, contacts 23 and 27, crank 10 and detector 14. However, this circuit is not yet completed. The crank motion also raises blade 5 whose engagement with detent 4 swings arm 3 upwardly and progressively opens the diaphragm 1. The film frames are thus progressively subjected to more and more scene light, accomplishing the desired fade-in for this scene.

When the diaphragm opening reaches the optimum value for the available scene brightness, as dictated by the position of needle 32, the latter is engaged by contact 15 of detector 14, and the circuit of battery 36 is completed to magnet 18. The latter thereupon magnetically attracts steel blade 5 and deflects its upper end away from detent 4. Diaphragm 1 is thus left standing at the properly adjusted aperture value. During the final travel of crank 10, contact 23 slips past contact 27 and opens the magnet circuit, but no further diaphragm adjustment is made.

Photographing of the scene continues as desired, and upon its completion the user gradually releases finger pressure on portion 12 of crank 10. As blade 5 descends, its corrugated portion will be in engagement with detent 4, and the diaphragm 1 will be progressively closed to accomplish the fade-out of the final scene frames on the film. The magnet 18 will not be energized, as the insulating pieces 24 and 26 prevent closure of the circuit between contact arms 22 and 25. In general, crank 10 will accomplish complete closure of the diaphragm before it engages its stop 30, and the resilience of blade 5 permits this over-travel, portion 6 slipping idly over detent 4 under the force of spring 37. Finally, crank 10 will arrive at the position shown, and will disengage camera button 40 to allow the camera to stop.

The length of fade-in and fade-out film portions can readily be controlled in terms of the rapidity with which operating portion 12 of crank 10 is pressed and released. In the event of a serious change in scene illumination during the taking process, a new diaphragm setting can be obtained, without appreciable waste of film, by a quick release and re-operation of the crank 10.

*Operation—Still Camera*

From what has already been said, it will be clear that operation with a movie camera is characterized by the fact that camera operation is initiated before the diaphragm has opened to its proper ultimate aperture for the scene being filmed. On the contrary, for use with still cameras, it is of course essential that the shutter not be actuated until after the proper diaphragm setting has been reached.

Figure 2:
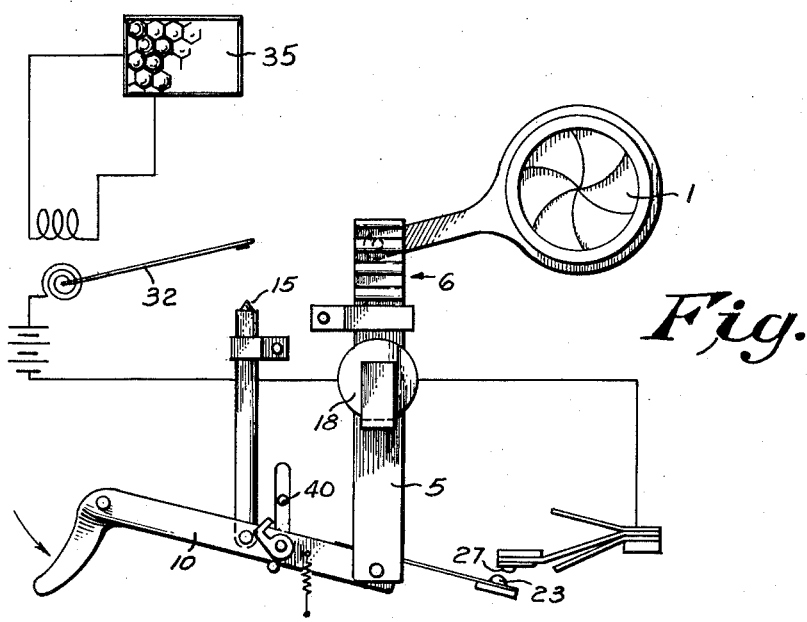
FIG. 2 is a front elevation of the same arrangement.

In this case, the abutment 41 is turned down as in FIGURE 2. Now, when the user presses on part 12 of crank 10, the same automatic diaphragm adjusting operations as before are accomplished, but crank 10 will not engage and operate the shutter trip (40) until the final portion of the crank movement. Hence the proper exposure will be obtained in the single still exposure. It may also be remarked that this position of abutment 10 will allow motion picture films to be taken without the automatic fade-in and fade-out, if the user so desires.

In the event the battery 36 should fail, one may easily adjust the diaphragm manually, using if desired the needle indication of the galvanometer as a guide. To do this, it is sufficient to forcibly adjust arm 3 after the crank 10 has been moved to its fully counter-clockwise position at the commencement of the scene; the resilience of blade 5 permits this to be done. However, excellent battery life is realized since the magnet 18 is energized only for a second or so at each operation; it does not draw current throughout the taking of scenes.

The extent to which the energization of photocell 35 produces motion of the needle 32 can additionally be modified, as known in the art, to allow for the use of films of different sensitivities and/or still shutter speeds, and for the frame-per-second rate or sector opening in the case of movie cameras. Such means may include a manually adjustable diaphragm 42 positioned in front of the photocell, and/or a resistor 43 in series with the cell circuit, the adjustable elements thereof being suitably calibrated to produce a proper exposure of the film for any combination of the camera parameters.

Second Embodiment

Figure 3:
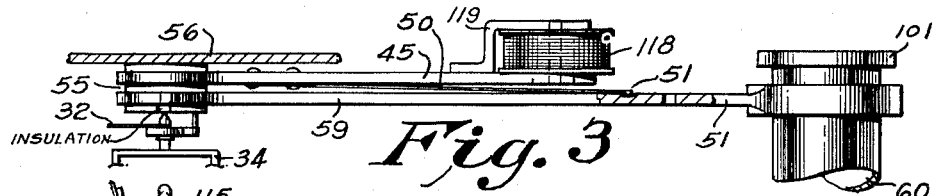
FIG. 3 is a horizontal sectional view taken on line 3—3 of FIGURE 4, respecting another form of the invention.
Figure 4:
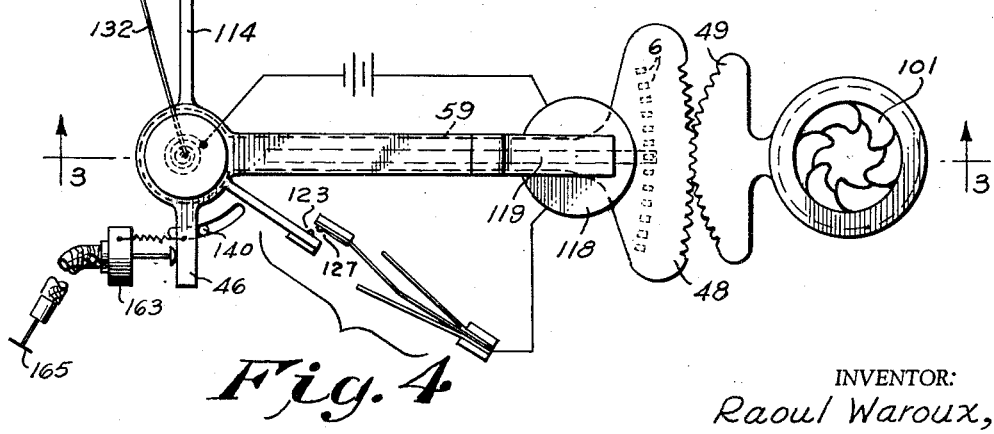
FIG. 4 is a front elevation of the said other form of the invention.

While the form of the invention just described is very suitable for either movie or still cameras, a more compact arrangement is possible, and is especially practical in the form of an attachment or accessory which can be applied to a camera otherwise complete in itself. Such an embodiment is shown in FIGURES 3, 4 and 5.

In place of a diaphragm-adjusting connection to the existing diaphragm ring of a camera lens structure, this second form of the invention provides a wholly separate diaphragm 101 mounted in an aperture or tunnel 60 through a casing 161 adapted to be secured in any convenient way to the front of a camera; the tunnel may in fact encompass the lens mount of the camera. When the automatic control is used, the regular lens diaphragm is left wide open. The major operating parts in this case are all mounted for rotation about a single axis, to reduce the need for reciprocating guides and the like.

Cognate parts in this embodiment are identified as in FIGURES 1 and 2 but with addition of 100 to the reference numerals. Thus, the diaphragm 101, meter needle 132, detector contact 115, detector 114, camera release operator 40, magnet circuit contacts 123, 127, and so on. In view of the similarity of construction and operation, only the differences will be explained in detail. Also, some parts are omitted from FIGURES 3 to 5 for simplicity of the drawings, these including the photocell, galvanometer coil, emulsion speed and frame speed (or selector shutter opening) adjustments, and the like.

Figure 5:
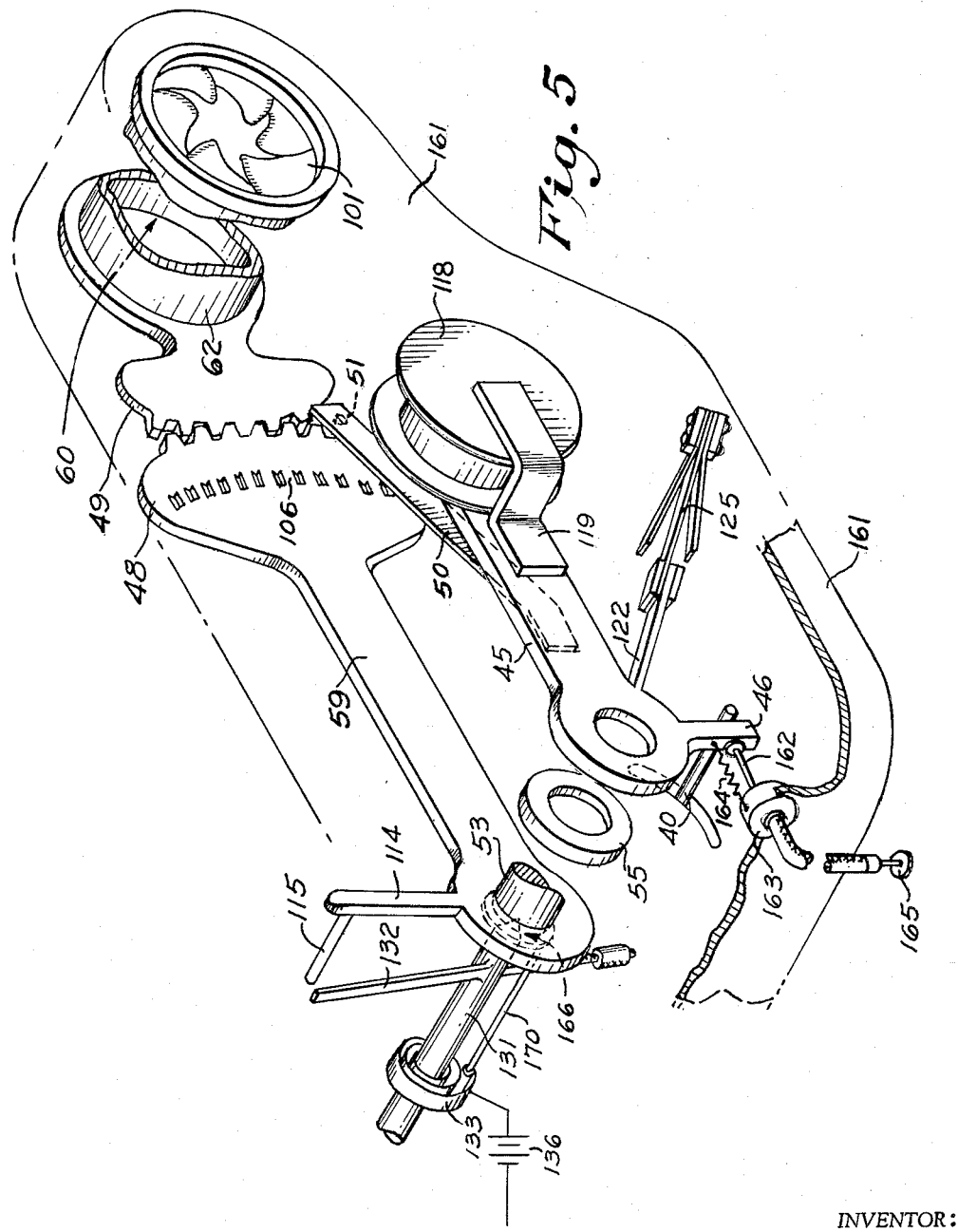
FIG. 5 is an exploded perspective view thereof.

The general organization of this form of the invention is best shown in the schematic exploded perspective view, FIGURE 5. Here, the casing for the control apparatus is indicated by numeral 161, and it may have any shape that is suited to the mounting thereof on the front panel of an existing camera. Thus, at the right-hand end of the casing, the diaphragm 101 may be mounted at the forward end of a tunnel 60 defined by the hollow tube 62 so that the diaphragm will be adjusted upon rotation of the tube. The existing camera lens mount, with its own diaphragm opened fully, can extend into the tunnel, permitting a very compact installation.

The rear end of tube 62 is provided with a sector gear 49 mating with a sector gear 48 of an arm 59, the latter having the teeth or serrations 106 adapted to be engaged by a detent or catch 51 carried at the end of a leaf spring 50 secured at its other end to a rotary arm 45 which also mounts the electromagnet 118, and its yoke 119. Arms 45 and 59 are concentrically mounted as on a shaft 53 fixedly extending from one face of the casing 161. Arm 45 has an operating arm 46 extending therefrom, and a spring 164 urges this arm normally to a clockwise position, from which it can be rotated in the counter-clockwise direction by the wire 162 of a cable release secured to the casing wall as at bushing 163. Outside the casing, the operating end 165 of the cable is available for manipulation by the operator in the usual way. A spacing washer 55 or the like between the rotary arms 45 and 59 ensures space for the flexing of spring leaf 50 when magnet 118 is energized, to disengage catch 51 from serrations 106. In this way, initial motion of the arm 45, when cable operator 165 is pressed, prepares the magnet circuit at the contact arms 122, 125 just as in the previous form of the invention, but until the magnet circuit is closed by the contact of its contact arm 115 with the galvanometer needle 132, arm 59 is carried along and the normally-closed diaphragm 101 opens up progressively.

The galvanometer needle 132 is mounted on a spindle 131 which is concentric with the shaft 53 fixed relative to casing 161, and the needle takes up a position depending upon the scene brightness. The photocell and circuitry are not repeated in connection with this form of the invention, being the same as already described. When the diaphragm has been opened to the proper value, the circuit of magnet 118 will be closed at 132, 115, and further motion of arm 45 will not alter the diaphragm setting, because the tooth 51 of leaf spring 50 is now out of engagement with the serrations 106. The galvanometer shaft 131 being made of conductive material, is insulated from stub shaft 53 and element 59, for example by reason of the fact that its conical pivot is received in a bearing block of insulation material secured at the end of shaft 53, as indicated at 166. The usual counterbalance weight for the moving coil system is provided, as shown. The conductor spring 133 for the needle shaft is secured mechanically against rotation of its outer end as by a pin 170 also of insulating material, secured to the flanged end of shaft 53. The circuit is connected the same as in FIGS. 1 to 3.

The camera release button or slide is again indicated at 40, and if the camera in use is a movie camera in which automatic fade-in and fade-out is desired, the control apparatus will be positioned relative to the release button so as to commence the taking of pictures before the diaphragm 101 has opened to any appreciable degree. In the case of a still camera, naturally, the single exposure will not be made until the proper diaphragm setting has been actually attained.

The control apparatus in the form of a detachable accessory may be specifically arranged to operate with a particular type of camera, or even with any of several suitable types, by proper location of the mounting means for the casing 161 with respect to the lens mounts and the camera release or trip buttons such as 40. It is also very simple to arrange the camera-operating connection also as a flexible cable extending from the casing 161 and adapted to cooperate with a camera release button or lever mounted anywhere on the camera body, as will be obvious to those skilled in this art.

Double-Action Rheostat Control

It has already been described, in connection with FIGURE 1, how a rheostat or variable resistance 43 may be provided in the photocell circuit to modulate the galvanometer current in accordance with different film sensitivities or shutter speeds, and how the other of these variables may be provided for as by a diaphragm 42. A way in which these variables may be taken into account with a single modulating element, while eliminating the relatively costly cell diaphragm, is illustrated in FIGURES 6 to 8 of the drawings.

Figure 7:
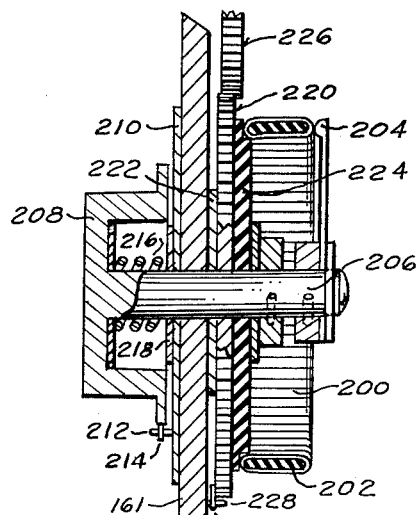
FIG. 7 is a vertical sectional view taken along the line 7—7 of FIG. 6.
Figure 6:
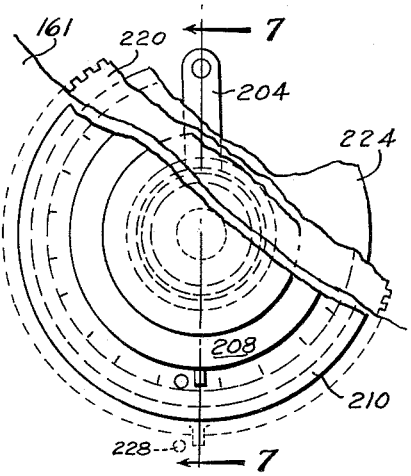
FIG. 6 is a front elevational view, partly broken away, of a dual adjustable rheostat for modulating the photocell output current jointly in accordance with two different exposure parameters.

As shown best in FIGURES 6 and 7, this device comprises a rheostat having the usual resistance winding 200 wound about an insulating card 202 of ring configuration with which cooperates a movable wiper contact 204. The position of wiper 204 is adjusted by shaft 206 to which it is secured, in turn rotatable from outside the casing 161 as by a knob 208 cooperating with a graduated scale on fixed scale plate 210. The scale can be graduated, for example, in film sensitivity values, and knob adjustment need be made only when a certain film is installed in the camera. A fixed pin 212 cooperates with a pin 214 on knob 208 to prevent more than a single rotation of the knob.

Adequate wiper tension is assured by the presence of a spiral compression spring 216 between the inner surface of the knob and the washer 218 on the housing 161 or plate 210. The shaft 206 passes freely through the housing wall as well as through a toothed gear 220 in effect journalled about the shaft, and spaced from the housing wall as by an anti-friction washer 222. The gear 220 carries an insulating plate 224 which fixedly mounts the body of the rheostat, namely the winding 200 and its card 202. Meshing with gear 220 is a second gear or pinion 226 which is coupled either to the shutter speed adjustment member in the case of a still camera, or to the frames-per-second or sector shutter-speed adjustment in the case of a movie camera. A fixed stop 228 cooperates with a pin 230 on gear 220 to prevent more than a single turn thereof.

Figure 8:
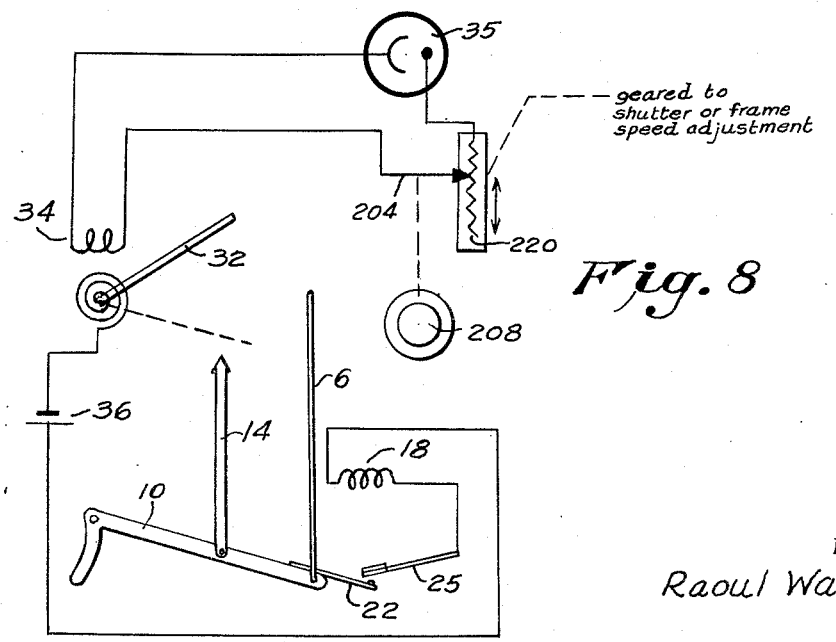
FIG. 8 is a schematic diagram illustrating the manner of connecting the device of FIGS. 6 and 7 to the photocell control circuit of a camera according to the invention.

FIGURE 8 illustrates the way in which the single rheostat serves to modulate the photocell current according to the two different exposure parameters as mentioned above. Knob 203 alters the series resistance in the cell circuit by reason of its positioning of the wiper 204, while the motion of the rheostat card as a whole likewise alters the resistance in accordance with the other exposure factor. Parts otherwise identical with those already described have been given similar numerals in FIGURE 8.

While the invention has been described in considerable detail in connection with certain preferred embodiments thereof, it is to be understood that these details can be varied considerably, by skilled workers in this art, without departing from the spirit of the invention as defined by the appended claims.

What is claimed is:

1. Exposure control apparatus for a photographic camera of the type including an adjustable element for regulating the exposure level of the camera film and a release element for initiating the exposure operation, comprising a manually operable element movable through a range of positions and positioned to engage and operate said release element at one point in its motion, a releasable connection between said manually operable element and said adjustable element, electromagnetic means for releasing said connection to terminate adjustment of said adjustable element during movement of said manually operable element, a battery, a galvanometer having a set of galvanometer-operated contacts in series with said battery and said electromagnetic means to operate the latter in response to a predetermined current flow in said galvanometer, and photoelectric exposure-gauging means connected to energize said galvanometer.

2. Apparatus in accordance with claim 1, including a device interposed between said manually operable element and said release element, and adjustable to determine the point during the travel of the former at which it will engage and operate the latter.

3. Exposure control apparatus in accordance with claim 2, in which said manually operable element and said release element are positioned to cause operation of the latter during an initial phase of the travel of the former, to initiate camera exposure operation substantially prior to the operation of said electromagnetic means, whereby to produce a graded exposure fade-in and fade-out at the respective ends of the film exposed in the camera during each scene.

4. Exposure control apparatus for a photographic camera of the type including an adjustable element for regulating the exposure level of the camera film and a release element for initiating the exposure operation, comprising a manually operable element movable through a range of positions and constructed to engage and operate said release element at one point in its motion, a releasable motion-transmitting connection between said manually operable element and said adjustable element, electromagnetic means for releasing said connection to terminate adjustment of said adjustable element during movement of said manually operable element at a later point in its motion, a battery, a galvanometer having a set of galvanometer-operated contacts in series with said battery and said electromagnetic means to operate the latter in response to a predetermined current flow in said galvanometer, photoelectric exposure-gauging means connected to energize said galvanometer, and means operable upon completion of the motion of said manually operable element for interrupting the said series circuit and maintaining it interrupted until completion of the return movement of said manually operable element.

5. Apparatus in accordance with claim 4, in which the last-named means comprises a pair of snap-over contact elements arranged to make electrical contact with one another in only one direction of their relative travel.

References Cited in the file of this patent
UNITED STATES PATENTS

| | | |
|---|---|---|
| 1,986,695 | Warner | Jan. 1, 1935 |
| 2,031,321 | Kuppenbender | Feb. 18, 1936 |
| 2,058,483 | Mihalyi | Oct. 27, 1936 |
| 2,058,531 | Tuttle | Oct. 27, 1936 |
| 2,198,454 | Mather | Apr. 23, 1940 |
| 2,220,951 | Borden | Nov. 12, 1940 |
| 2,319,204 | Bolsey | May 18, 1943 |
| 2,845,839 | Pellegrini | Aug. 5, 1958 |

FOREIGN PATENTS

| | | |
|---|---|---|
| 1,184,474 | France | Feb. 2, 1959 |